Dec. 26, 1922.                                                              1,440,054
Z. E. CAMELINAT.
LAMP FOR VEHICLES AND OTHER PURPOSES.
FILED JULY 8, 1921.
2 SHEETS-SHEET 1
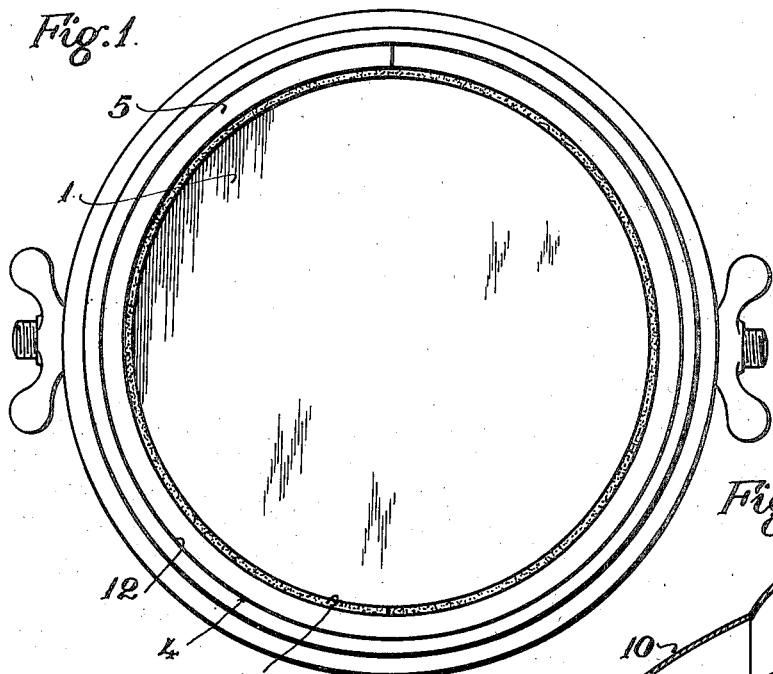
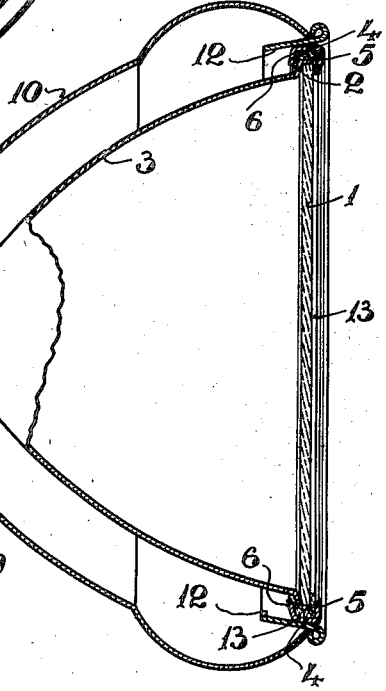
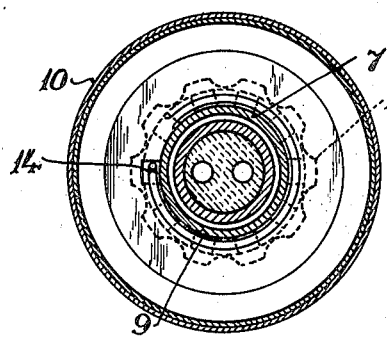
INVENTOR
Zepharin Eugene Camelinat
BY
ATTORNEYS.

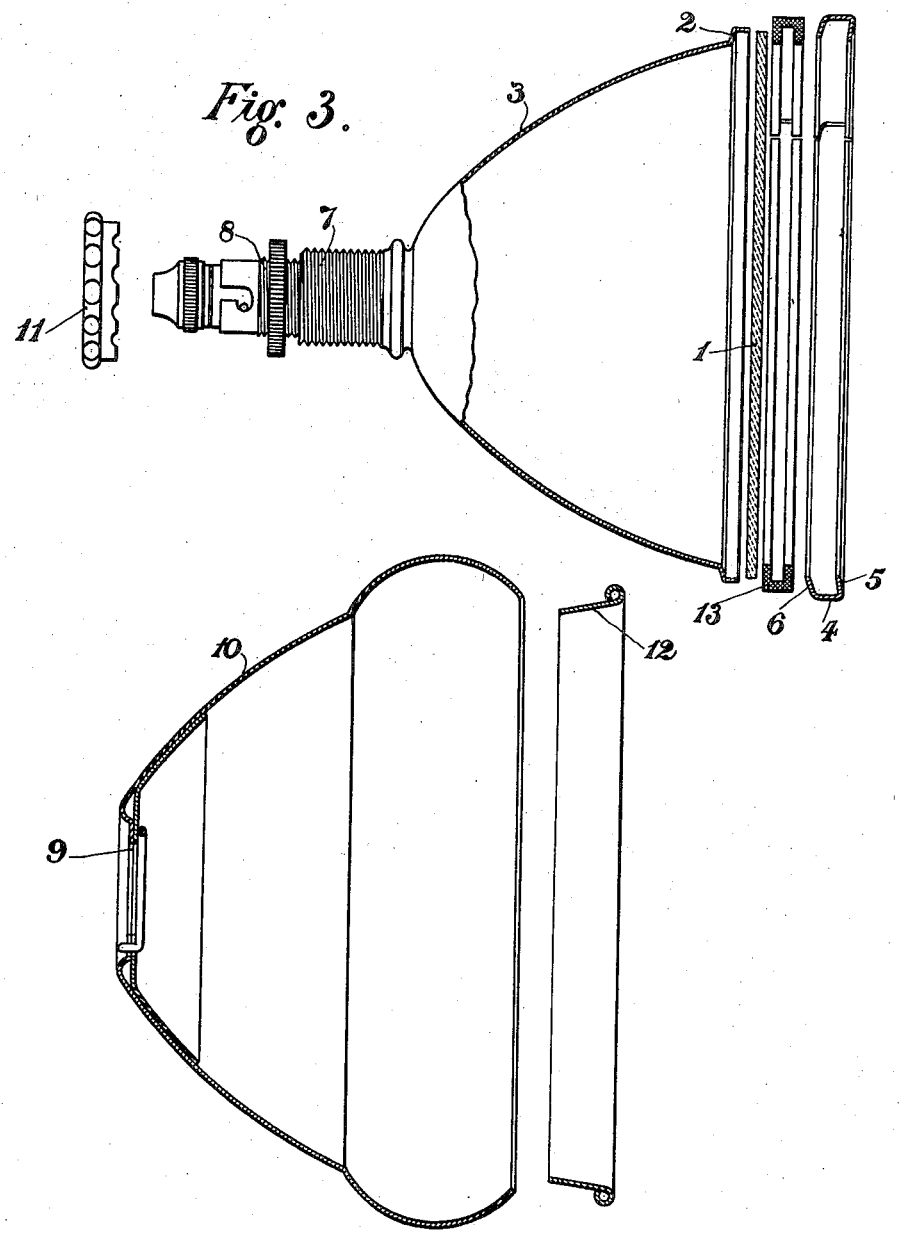

Patented Dec. 26, 1922.

1,440,054

UNITED STATES PATENT OFFICE.

ZEPHARIN EUGENE CAMELINAT, OF BIRMINGHAM, ENGLAND.

LAMP FOR VEHICLES AND OTHER PURPOSES.

Application filed July 8, 1921. Serial No. 483,209.

*To all whom it may concern:*

Be it known that I, ZEPHARIN EUGENE CAMELINAT, subject of the King of Great Britain, residing at 35 Tenby Street, Birmingham, England, have invented certain new and useful Improvements in Lamps for Vehicles and Other Purposes, of which the following is a specification.

This invention relates to lamps for vehicles and other purposes, the invention being particularly applicable to electric lamps for motor vehicles.

The object of the invention is to provide improved means for securing the lamp glass and reflector to the lamp body, which obviates the necessity of having a hinged or detachable lamp front, so that the projections or joints present when the front is detachable or hinged are avoided, thus imparting a neat and improved appearance to the lamp.

According to the invention the lamp glass is fitted against the edge of the reflector, and a split ring or band is engaged around the edge of the glass and around the edge of the reflector, and is arranged to be forced against an inclined or conical seating formed around the lamp body, the said inclined or conical seating causing the split ring or band to contract around the reflector and the glass, so that they are rigidly held together, and at the same time secured within the lamp body.

Figure 1 is a front view of a lamp constructed in accordance with this invention.

Figure 2 is a longitudinal vertical section through the lamp.

Figure 3 is a view showing the respective parts separated to more clearly show their relationship to each other and Figure 4 is a section on the line 4—4 Figure 2.

Thus, in carrying out the invention as shown in the accompanying drawings, the lamp glass 1 is fitted upon an annular inclined seating 2 formed around the inner face of the reflector 3, adjacent to its front edge, so that the glass projects slightly beyond the latter, the seating forming an annular rib or beading around the outer face of the reflector, the inner side of the said rib or beading being inclined. Fitted around the said beading is a substantially channel-shaped split ring 4, one flange or side 5 of which engages with the front face of the glass, whilst its other side 6 is inclined and arranged to engage with the inclined side of the rib or beading. The inner end of the reflector (which latter is of a conical formation) carries a short sleeve 7 within which is screwed the electric lamp holder 8, the sleeve being adapted to be engaged with a central hole 9 in the back of the lamp body 10 and secured by a nut 11 upon the said sleeve, which is externally screw-threaded, the said nut being arranged to bear against the back of the lamp body. When the sleeve is inserted through the central hole in the lamp body in this manner it is arranged so that the split ring fitted around the glass and the outer edge of the reflector engages against an inclined internal flange 12 formed around the inside of the lamp body adjacent to its front edge, the said flange tapering inwards towards the central axis of the lamp body, which is of a part spherical or dome formation. When the nut upon the sleeve is screwed against the end of the lamp body the reflector is drawn inwards and the split ring drawn tightly against the inclined flange upon the lamp body so that the said ring is caused to contract and the glass and reflector are securely clamped together, the said glass and reflector being also rigidly secured to the lamp body.

By unscrewing the nut upon the sleeve the reflector and glass may be readily withdrawn from the lamp body and the split ring removed, thus permitting of the glass and reflector being separated for cleaning or other purposes.

In order to prevent the nut 11 from inadvertently unscrewing a spring influenced projection 14 may be provided mounted upon the lamp body and adapted to engage with recesses upon the nut.

A rubber or other resilient lining or washer 13 may be provided which surrounds the edges of the glass and the reflector, and which is disposed between the said edges and the split ring whereby, when the latter is contracted, a perfectly air tight joint is obtained.

The reflector and lamp body may be of any suitable shape.

Having fully described my invention, what I desire to claim and secure by Letters Patent is:—

1. A lamp comprising a lamp body having an inclined seating around the interior of its mouth, a reflector within said body, a glass adapted to engage the edge of the reflector, a split ring adapted to seat within said inclined seating and to engage around the edges of the glass and the edge of the reflector and means for drawing the split ring axially along said inclined seating whereby it is contracted around the edge of the glass and the edge of the reflector.

2. A lamp comprising a lamp body having an inclined seating around the interior of its mouth, a reflector within said body, a glass adapted to engage the edge of the reflector, a split ring adapted to seat within said inclined seating and to engage around the edges of the glass and the edge of the reflector, a channelled gasket seated within said ring adapted to engage around the outer rims of said glass and reflector and means for drawing said split ring axially along said inclined seating whereby said ring will contract said gasket around and into secure engagement with said glass and reflector.

3. A lamp comprising a lamp body having an inwardly inclined seating around the interior of its mouth, a reflector within said body, a glass adapted to engage the edge of the reflector, a split ring adapted to engage around the edges of the glass and the edge of the reflector, and means for drawing the reflector towards the back of the lamp whereby the ring is moved axially into engagement with the seating and is thereby contracted around the edge of the glass and the edge of the reflector.

In testimony whereof I have hereunto set my hand in presence of two subscribing witnesses.

ZEPHARIN EUGENE CAMELINAT.

Witnesses:
U. L. SKERRETT,
W. S. SKERRETT.